United States Patent [19]

Grabowski geb. Marszalek et al.

[11] Patent Number: 4,526,874

[45] Date of Patent: Jul. 2, 1985

[54] OPTICAL LIGHT WEIGHT GLASS WITH A REFRACTIVE INDEX OF >1.70, AN ABBE INDEX OF >22 AND A DENSITY OF <3.5 G/CM³

[75] Inventors: Danuta Grabowski geb. Marszalek, Wiesbaden; Ludwig Ross, Klein-Winternheim; Volkmar Geiler, Mainz-Finthen; Karl Mennemann, Taunesstein, all of Fed. Rep. of Germany

[73] Assignee: Schott Glaswerke, Mainz, Fed. Rep. of Germany

[21] Appl. No.: 488,951

[22] Filed: Apr. 27, 1983

[30] Foreign Application Priority Data

May 3, 1982 [DE] Fed. Rep. of Germany ....... 3216451

[51] Int. Cl.³ .......................... C03C 3/08; C03C 3/10; C03C 3/30
[52] U.S. Cl. ...................................... 501/77; 501/58; 501/59; 501/61; 501/62; 501/63; 501/64; 501/65; 501/66; 501/67; 501/75; 501/76; 501/78; 501/79; 501/901; 501/903
[58] Field of Search ..................... 501/58, 59, 61, 62, 501/63, 64, 65, 66, 67, 75, 76, 77, 78, 79, 901, 903

[56] References Cited

U.S. PATENT DOCUMENTS

| | | | |
|---|---|---|---|
| 3,898,093 | 8/1975 | Faulstich et al. | 501/903 |
| 4,149,895 | 4/1979 | Boudot et al. | 501/903 |
| 4,390,638 | 6/1983 | Mennemann et al. | 501/903 |

FOREIGN PATENT DOCUMENTS

| | | | |
|---|---|---|---|
| 2824982 | 12/1979 | Fed. Rep. of Germany | 501/903 |
| 53-16718 | 2/1978 | Japan | 501/903 |
| 55-126549 | 9/1980 | Japan | 501/903 |

*Primary Examiner*—Mark Bell
*Attorney, Agent, or Firm*—Haight & Associates

[57] ABSTRACT

An optical glass with the familiar optical position of $n_d > 1.70$ and $v_d > 22$, which differs from the familiar optical glasses of the optical position due to its lower density and good chemical stability, and is composed of (in percent by weight): $SiO_2$ 25-42, $TiO_2$ 15-35, $B_2O_3$ 0.5-7, $BaO$ 3-13, $CaO$ 1-3, $Nb_2O_5$ 1-20, $GeO_2$ 0-2, $Al_2O_3$ 0-4, $Na_2O$ 7.5-15, $Li_2O$ 0-9, $K_2O$ 2-10, $SrO$ 0-6, $ZnO$ 0-5, $ZrO_2$ 0-3, and $WO_3$ 0-3.

9 Claims, No Drawings

OPTICAL LIGHT WEIGHT GLASS WITH A REFRACTIVE INDEX OF >1.70, AN ABBE INDEX OF >22 AND A DENSITY OF <3.5 G/CM³

DESCRIPTION OF THE INVENTION

1. Technical Field of the Invention

This invention relates to optical glass compositions in the familiar range of refractive indices of 1.7–1.85 and having an Abbe number of >22, which share such optical properties with conventional glasses but which differ from them because of greatly reduced density and improved chemical stability.

2. Background Art

The state of the art known to the present inventors which most closely approximates the present invention has been described in JP-OS No. 79 88 917 and in JP-OS No. 80 126 549. According to these teachings, lightweight glasses of the above-mentioned optical range can be manufactured; however, these glasses exhibit some considerable disadvantages. The compositions described in JP-PS No. 79 88 917 do without the utilization of any $Nb_2O_5$ whatsoever, and those in JP-OS No. 80 126 549 permit a maximum use of $Nb_2O_5$ of 12 percent by weight and a $WO_3$ component of not more than 0.5 percent by weight. Therefore, in order to produce the high refractive value, very high contents of $TiO_2$ and/or $ZrO_2$ have to be used, which results in higher crystallization and which provides useable glass in the desired dimensions only after considerably greater technical effort and at lower yields.

The stability of the glasses described in the above-quoted documents can be described by the ratio of the $SiO_2$ to the $TiO_2$ content. When this ratio is <1.25, glass stability decreases greatly.

On the other hand, the examples given in JP-PS No. 77 25 812 result in completely crystallized, unusable solids if the traditional processing methods are used, so that it is obviously difficult to obtain any usable optical glass at all for the range of composition of the patent document.

DISCLOSURE OF THE INVENTION

Accordingly, it is a general object of this invention to provide an optical quality glass combining the properties of a high refractive index, a moderate Abbe number, a low density, good stability towards melting procedures, and good chemical resistance.

Another object of this invention is to produce such glass compositions which can be produced in large melting containers to form large dimensional products.

A further object of this invention is to provide glass compositions having optical transmission characteristics considerably greater than conventional heavy flint glasses.

An additional object of this invention is to provide glass compositions having a refractive index of 1.74–1.79, an Abbe number of at least 25–29, and a density of 3.1–3.3 g/cm³.

A more particular object of this invention is to provide lens blanks and polished camera lenses made from the novel glass compositions herein.

Upon study of the specification and appended claims, further objects, features and advantages of this invention will become more fully apparent to those skilled in the art to which this invention pertains.

BEST MODE FOR CARRYING OUT THE INVENTION

Briefly, the above and other objects, features and advantages of this invention are attained in one aspect thereof by providing a glass composition which meets all of the above-mentioned requirements and is characterized by containing (in percent by weight) the following components:

(a) glass forming oxides: $SiO_2$ 25–42, $GeO_2$ 0–2, $B_2O_3$ 0.5–7, $Al_2O_3$ 0–4, but preferably by: $SiO_2$ 30–35, $GeO_2$ 0–1, $B_2O_3$ 0.5–3, $Al_2O_3$ 0–2;

(b) alkali metal oxides: $Li_2O$ 0–9, $Na_2O$ 7.5–15, $K_2O$ 2–10, but preferably: $Li_2O$ 0–3, $Na_2O$ 7.5–13, $K_2O$ 4–6, with the sum of alkali metal oxides being 12–18;

(c) MgO 0–5, CaO 1–3, SrO 0–6, BaO 3–13, ZnO 0–5, but preferably: MgO 0–2, CaO 1–3, SrO 0–2, BaO 7–13, ZnO 0–2, and the sum of these alkaline earth metal oxides being 8–15;

(d) additional components:

| | |
|---|---|
| $TiO_2$ | 15–35 |
| $ZrO_2$ | 0–3 |
| $Nb_2O_5$ | 1–20 |
| $WO_3$ | 0–3, | but preferably:

| | |
|---|---|
| $TiO_2$ | 20–30 |
| $ZrO_2$ | 0–3 |
| $Nb_2O_5$ | 7–19 |
| $WO_3$ | 0.2–2; | wherein the ratio of $SiO_2$ to $TiO_2$ is in the range of about 1 to 1.75; and (e) optionally one or more of the following additional oxides:

| | |
|---|---|
| PbO | 0–5 |
| $La_2O_3$ | 0–3 |
| $Y_2O_3$ | 0–5 |
| $Bi_2O_3$ | 0–2 |
| $Gd_2O_3$ | 0–4 |
| $Ta_2O_5$ | 0–2. |

Additionally, the glass contains no more than 1.5 percent by weight of fluorine in the form of F⁻ ions and/or 0.2–2 percent by weight of $SnO_2$, and no more than about 2 percent by weight of other unmentioned glass-forming oxides.

The glasses of the present invention meet both the requirement of low density (<3.5 g/cm³ for refractive values of >1.70 and Abbe indices of >22) and also the requirement of a sufficient stability towards melting procedures customary in industry today. The relatively high crystallization stability is achieved by specific amounts of $Nb_2O_5$, $WO_3$ and/or $Al_2O_3$, CaO, MgO and by the ratio of $SiO_2$ to $TiO_2$, which has been greatly increased over those of the familiar composition ranges known in the prior art. The particularly good chemical stability of the glasses of the present invention is caused by small quantities of $B_2O_3$ (up to 7 percent by weight), $Al_2O_3$ (up to 4 percent by weight) and $WO_3$ (up to 3 percent by weight), and by the high content of $TiO_2$ (15–35 percent by weight).

Table 1 compares some examples of the present invention with conventional glasses (SF 4, SF 11 and SF 56, see SCHOTT Catalog No. 3111 D, 1980); acid resistance and alkali resistance were determined as described in the cited SCHOTT catalog, the contents of which are incorporated by reference herein.

|  | SF 4 | Example 3 | SF 11 | Example 7 | SF 56 | Example 9 |
|---|---|---|---|---|---|---|
| nd | 1.7552 | 1.7552 | 1.7847 | 1.7826 | 1.7847 | 1.7845 |
| vd | 27.58 | 27.36 | 25.67 | 25.60 | 26.08 | 26.10 |
| density | 4.79 | 3.15 | 4.74 | 3.21 | 4.92 | 3.28 |
| SR* | 5 | 1 | 2 | 1 | 3 | 1 |
| AR** | 2.3 | 1.0 | 1.2 | 1.0 | 2.2 | 1.3 |

*SR = acid resistance (Saureresistenz):

|  | SR 1 | SR 2 | SR 3 | SR 4 | SR 5 |
|---|---|---|---|---|---|
| Time (h) | >100 | 100-10 | 10-1 | 1-0.1 | <0.1 |

Time for the removal of 0.1 μm from a polished layer with 0.5 N $HNO_3$, in hours.

**AR = alkali resistance:

|  | AR 1 | AR 2 |
|---|---|---|
| Time (h) | >120 | 120-30 |

Time for the removal of 0.1 μm from a polished layer with NaOH pH 10, in hours.
Evaluation:
0 - no visible change
1 - scarred surface, no visible formation of layers
2 - interference colors
3 - white spot.

In addition to the above stated main requirements, the glasses of the present invention also meet the requirement for sufficient crystallization stability so that they can be produced in large melting containers (e.g. 100 liter crucibles) and in large dimensions (e.g. glass blocks of 300×300×200 mm). Moreover, the glasses of the present invention are different from those known in the prior art because of their considerably greater transmission (Example: pure transmission at 400 nm and 25 mm thickness of layer SF 11=0.21; Ex. 7=0.55) than found in conventional heavy flint glasses. Thus, the glasses of the present invention permit a considerable improvement both with respect to weight and also the imagery quality of high quality optical equipment, e.g. portable television cameras.

Compared with the heavy flint glasses cutomarily used for this optical range, the glasses of the present invention exhibit considerably less discoloration, which is expressed in increased pure transmission. By adding small quantities of F— (e.g., as NaF), this property can be further improved.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever. All temperatures are set forth uncorrected in degrees Celsius; unless otherwise indicated, all pressures are ambient and all parts and percentages are by weight.

EXAMPLES 1-11

The glasses of the present invention are manufactured according to techniques known in the art, e.g. in the following manner: The raw materials (oxides, preferably carbonates, potentially nitrates and fluorides) are weighed; a clarifying agent, such as $As_2O_3$ is added in quantities of 0.1-1 percent by weight, and then the mixture is mixed well. The glass mixture is then melted down in a Pt- or ceramic crucible at about 1250°-1300° C., is subsequently clarified and is well homogenized by means of an agitator. At a pouring temperature of 1050°-1200°, the glass is processed into the desired dimensions.

By way of example, the following melt was used to produce the glass of Example 3:

| Melting example for 100 kg calculated glass weight | | | |
|---|---|---|---|
| Oxide | Percent by weight | Raw Material | Quantity Weighed in (kg) |
| $SiO_2$ | 33.00 | quartz powder (Si pure) | 33.05 |
| $B_2O_3$ | 0.50 | $H_3BO_3$ | 0.89 |
| BaO | 9.00 | $BaCO_3$ | 11.75 |
| CaO | 2.00 | $CaCO_3$ | 3.56 |
| $Na_2O$ | 12.00 | $Na_2CO_3$ | 20.60 |
| $K_2O$ | 5.30 | $K_2CO_3$ | 7.77 |
| $TiO_2$ | 27.80 | $TiO_2$ | 28.00 |
| $Nb_2O_5$ | 9.80 | $Nb_2O_5$ | 9.80 |
| $WO_3$ | 0.60 | $WO_3$ | 0.60 |
|  |  |  | 116.02 kg |
|  |  | $As_2O_3$ | 0.20 kg clarifying agent |
|  |  |  | 116.22 kg mixture |

Table 2 contains 11 examples of embodiments for the preferred range of composition having a refractive index of about 1.7455-1.7892, an Abbe number of about 25.54-28.76, a density of about 3.12-3.30 g/cm³, and the following composition, in percent by weight:

| $SiO_2$ | 31.00-35.10 |
|---|---|
| $B_2O_3$ | 0.5-2.85 |
| $SnO_2$ | 0-1 |
| NaF | 0-1.00 |
| $Na_2O$ | 7.88-12.00 |
| $K_2O$ | 5.30-5.55 |
| total alkali metal oxides | 13.93-17.53 |
| PbO | 0-0.60 |
| CaO | 1.06-2.01 |
| BaO | 6.24-12.44 |
| total alkaline earth oxides | 7.90-14.21 |
| $TiO_2$ | 20.18-29.16 |
| $Nb_2O_5$ | 8.5-18.56 |
| $La_2O_3$ | 0-1.0 |
| $WO_3$ | 0.10-1.92 |
| $Y_2O_3$ | 0-1.0 |
| $Gd_2O_3$ | 0-1.0 |
| $As_2O_3$ | 0.10-0.20 | wherein the $SiO_2:TiO_2$ ratio is 1.13-1.74.

TABLE 2

| | Melting Examples (in % by weight) | | | | | | | | | | |
|---|---|---|---|---|---|---|---|---|---|---|---|
| | 1 | 2 | 3 | 4 | 5 | 6 | 7 | 8 | 9 | 10 | 11 |
| $SiO_2$ | 35.10 | 32.25 | 33.00 | 33.24 | 32.90 | 32.80 | 32.80 | 31.00 | 32.89 | 31.00 | 31.80 |
| $B_2O_3$ | 0.50 | 2.85 | 0.50 | 0.50 | 0.50 | 0.55 | 0.55 | 0.52 | 0.55 | 0.52 | 0.55 |
| $SnO_2$ | — | — | — | — | — | — | — | — | — | — | 1.00 |
| BaO | 12.30 | 12.30 | 9.00 | 9.00 | 12.44 | 7.24 | 7.24 | 10.28 | 6.24 | 9.28 | 7.24 |
| CaO | 1.91 | 1.91 | 2.00 | 2.01 | 1.56 | 1.15 | 1.15 | 1.20 | 1.06 | 1.20 | 1.15 |
| PbO | — | — | — | — | — | — | — | — | 0.60 | — | — |
| $Na_2O$ | 8.54 | 8.54 | 12.00 | 12.00 | 8.62 | 9.51 | 9.51 | 9.50 | 7.88 | 9.50 | 9.51 |

TABLE 2-continued

| | Melting Examples (in % by weight) | | | | | | | | | | |
|---|---|---|---|---|---|---|---|---|---|---|---|
| | 1 | 2 | 3 | 4 | 5 | 6 | 7 | 8 | 9 | 10 | 11 |
| NaF | — | — | — | — | — | — | — | — | 1.00 | — | — |
| $K_2O$ | 5.39 | 5.39 | 5.30 | 5.53 | 5.45 | 5.55 | 5.55 | 5.50 | 5.55 | 5.50 | 5.55 |
| $TiO_2$ | 20.18 | 20.18 | 27.80 | 27.80 | 29.16 | 24.14 | 24.14 | 23.50 | 24.04 | 23.50 | 24.14 |
| $Nb_2O_5$ | 16.08 | 16.08 | 9.80 | 8.50 | 9.36 | 18.56 | 18.06 | 18.00 | 18.56 | 17.00 | 18.56 |
| $La_2O_3$ | — | — | — | — | — | — | — | — | 1.00 | — | — |
| $WO_3$ | 0.15 | 0.50 | 0.60 | 1.92 | 0.20 | 0.50 | 1.00 | 0.50 | 0.10 | 0.50 | 0.50 |
| $Y_2O_3$ | — | — | — | — | — | — | — | — | — | 1.00 | — |
| $Gd_2O_3$ | — | — | — | — | — | — | — | — | — | 1.00 | — |
| $As_2O_3$ | 0.2 | 0.15 | 0.20 | 0.15 | 0.10 | 0.10 | 0.10 | 0.10 | 0.10 | 0.10 | 0.10 |
| nd | 1.7455 | 1.7476 | 1.7552 | 1.7535 | 1.7661 | 1.7826 | 1.7816 | 1.7826 | 1.7862 | 1.7892 | 1.7847 |
| vd | 28.70 | 28.76 | 27.36 | 27.50 | 26.20 | 25.60 | 25.62 | 26.10 | 25.71 | 25.84 | 25.54 |
| $\rho[g/cm^3]$ | 3.20 | 3.25 | 3.15 | 3.16 | 3.18 | 3.21 | 3.12 | 3.28 | 3.30 | 3.25 | 3.19 |

The preceding examples can be repeated with similar success by substituting the generically or specifically described reactants and/or operating conditions of this invention for those specifically used in the examples. From the foregoing description, one skilled in the art to which this invention pertains can easily ascertain the essential characteristics thereof and, without departing from the spirit and scope of the present invention, can make various changes and modifications to adapt it to various usages and conditions.

INDUSTRIAL APPLICABILITY

As can be seen from the present specification and examples, the present invention is industrially useful in providing a new type of glass compositions suitable for high quality applications such as in the manufacture of camera lenses.

What is claimed is:

1. An optical glass having a refractive index of 1.74–1.79, an Abbe number of 25–29 and a density of 3.1–3.3 g/cm³, with crystallization stability sufficiently good to enable the glass to be produced in 100 liter crucible melts and chemical stability characterized by having an acid resistance of >100 hrs. for removal of 0.1 μm, from a polished layer with 0.5N $HNO_3$ and an alkali resistance of >120 hrs. for removal of 0.1 μm from a polished layer with NaOH at pH 10, containing not more than 1.5 percent by weight ionic fluorine and not more than 2 percent by weight $SnO_2$, consisting essentially of the following composition, in percent by weight:

| | |
|---|---|
| $SiO_2$ | 30–35 |
| $GeO_2$ | 0–1 |
| $B_2O_3$ | 0.5–3 |
| $Al_2O_3$ | 0–2 |
| $Li_2O$ | 0–3 |
| $Na_2O$ | 7.5–13 |
| $K_2O$ | 4–6 |
| total alkali metal oxides | 12–18 |
| MgO | 0–2 |
| CaO | 1–3 |
| SrO | 0–2 |
| BaO | 7–13 |
| ZnO | 0–2 |
| total alkaline earth oxides | 8–15 |
| $TiO_2$ | 20–30 |
| $ZrO_2$ | 0–3 |
| $Nb_2O_5$ | 7–19 and |
| $WO_3$ | 0.2–2, | wherein the $SiO_2:TiO_2$ ratio is 1–1.75.

2. A glass according to claim 1 further comprising 0.5–5 percent by weight of PbO.

3. A glass according to claim 1 further comprising 1–3 percent by weight of $La_2O_3$.

4. A glass according to claim 1 further comprising 1–5 percent by weight of $Y_2O_3$.

5. A glass according to claim 1 further comprising 1–2 percent by weight of $Bi_2O_3$, 1–4 percent by weight of $Gd_2O_3$ and 1–2 percent by weight of $Ta_2O_5$.

6. A glass according to claim 1 further containing 0.2–1.5 percent by weight of fluorine ions.

7. A glass according to claim 1 further containing 0.2–2 percent by weight of $SnO_2$ in order to increase transmission.

8. A glass according to claim 1 further containing not more than 2 percent by weight of other unnamed glass-forming oxides.

9. An optical glass having a refractive index of about 1.7455–1.7892, an Abbe number of about 25.54–28.76, a density of about 3.12–3.30 g/cm³, with crystallization stability sufficiently good to enable the glass to be produced in 100 liter crucible melts and chemical stability characterized by having an acid resistance of >100 hrs. for removal of 0.1 μm from a polished layer with 0.5N $HNO_3$ and an alkali resistance of >120 hrs. for removal of 0.1 μm from a polished layer with NaOH at pH 10, containing not more than 1.5 percent by weight ionic fluorine, consisting essentially of, in percent by weight:

| | |
|---|---|
| $SiO_2$ | 31.00–35.10 |
| $B_2O_3$ | 0.5–2.85 |
| $SnO_2$ | 0–1 |
| NaF | 0–1.00 |
| $Na_2O$ | 7.88–12.00 |
| $K_2O$ | 5.30–5.55 |
| total alkali metal oxides | 13.93–17.53 |
| PbO | 0–0.60 |
| CaO | 1.06–2.01 |
| BaO | 6.24–12.44 |
| total alkaline earth oxides | 7.90–14.21 |
| $TiO_2$ | 20.18–29.16 |
| $Nb_2O_5$ | 8.5–18.56 |
| $La_2O_3$ | 0–1.0 |
| $WO_3$ | 0.10–1.92 |
| $Y_2O_3$ | 0–1.0 |
| $Gd_2O_3$ | 0–1.0 |
| $As_2O_3$ | 0.10–0.20 | wherein the $SiO_2:TiO_2$ ratio is 1.13–1.74.

* * * * *